United States Patent
Jungbluth et al.

(10) Patent No.: US 9,631,723 B2
(45) Date of Patent: Apr. 25, 2017

(54) VEHICLE AND METHOD TO CONTROL ROLLING ENGAGEMENTS

(71) Applicant: Ford Global Technologies, LLC, Dearborn, MI (US)

(72) Inventors: Karl M. Jungbluth, Commerce, MI (US); Christopher Marcus Williams, Farmington Hills, MI (US); Kurt Howard Nickerson, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 195 days.

(21) Appl. No.: 14/605,456

(22) Filed: Jan. 26, 2015

(65) Prior Publication Data
US 2016/0215877 A1    Jul. 28, 2016

(51) Int. Cl.
| F16H 61/682 | (2006.01) |
| F16H 61/02 | (2006.01) |
| F16H 61/00 | (2006.01) |
| F16H 59/44 | (2006.01) |

(52) U.S. Cl.
CPC ..... *F16H 61/0246* (2013.01); *F16H 61/0059* (2013.01); *B60Y 2400/427* (2013.01); *F16H 59/44* (2013.01); *F16H 2059/446* (2013.01)

(58) Field of Classification Search
CPC ......... F16H 61/688; F16H 63/00; F16H 63/40
USPC .......................................................... 74/335
See application file for complete search history.

(56) References Cited

U.S. PATENT DOCUMENTS

| 4,430,911 | A | 2/1984 | Morscheck |
| 5,046,592 | A | 9/1991 | Mainquist et al. |
| 6,278,926 | B1 | 8/2001 | Jain et al. |
| 6,549,838 | B2 | 4/2003 | O'Neil et al. |
| 7,189,182 | B2 | 3/2007 | Stevenson et al. |
| 8,494,738 | B2 | 7/2013 | Lee et al. |
| 2010/0063694 | A1* | 3/2010 | Lee ............... B60W 10/02 701/54 |
| 2010/0063698 | A1* | 3/2010 | Lee ............... F16H 61/686 701/67 |
| 2011/0024210 | A1* | 2/2011 | Holmes ........... B60K 6/387 180/65.25 |
| 2011/0238275 | A1* | 9/2011 | Watanabe ....... F16H 61/0437 701/67 |

* cited by examiner

*Primary Examiner* — Ha D Ho
(74) *Attorney, Agent, or Firm* — James Dottavio; Brooks Kushman P.C.

(57) ABSTRACT

When a vehicle driver selects reverse while a vehicle is moving forward, a transmission controller applies friction shift elements within the transmission to create a partial tie-up condition to decelerate the vehicle. Once the vehicle slows below a threshold speed, the controller engages a selectable one way brake and releases some of the friction shift elements to engage a reverse gear ratio.

6 Claims, 6 Drawing Sheets ed to the field of automatic transmission controls. More particularly, the disclosure pertains to a method of engaging a controllable one way clutch to establish an opposite direction power flow path.

VEHICLE AND METHOD TO CONTROL ROLLING ENGAGEMENTS

TECHNICAL FIELD

This disclosure relates to the field of automatic transmission controls. More particularly, the disclosure pertains to a method of engaging a controllable one way clutch to establish an opposite direction power flow path.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Generally, transmissions include at least one negative speed ratio which is engaged when the driver selects reverse.

Many automatic transmissions implement a discrete number of different transmission ratios in which each ratio is establish by engaging a particular subset of friction shift elements and/or other shift elements. Shift elements may include devices that couple two rotating elements to one another, commonly called clutches, and devices which couple a rotating element to a stationary element, commonly called brakes. To shift from one speed ratio to another speed ratio, one shift element, called the off-going element, is released and another shift element, called the oncoming element, is engaged. Some types of shift elements, such as dog clutches, have no capability to absorb energy during engagement. When the oncoming element is a shift element of this type, the shafts to be coupled must be at very nearly the same speed before engagement.

When the vehicle is stationary, the gearbox input is also stationary even for very high speed ratios. Since an internal combustion engine cannot generate torque at zero crankshaft speed, a launch device is necessary to permit the engine to rotate and transmit torque to the gearbox input. Many automatic transmission utilize a torque converter having an impeller driven by the engine crankshaft and a turbine driving the gearbox input shaft. Torque is transferred from the impeller to the turbine whenever the impeller rotates faster than the turbine. Torque is transferred in the opposite direction when the turbine rotates faster than the impeller.

SUMMARY OF THE DISCLOSURE

A transmission includes input and output shafts, a switchable shift element, a plurality of friction shift elements, and a controller. The transmission may also include a torque converter. The switchable shift element is configured to switch between a lock-lock state in which two components are coupled and a lock-free state in which relative rotation between the components is allowed in only one direction. The plurality of friction shift elements are engageable in combinations of two to establish a plurality of power flow paths including at least one reverse power flow path. The reverse power flow path is established by engagement of a reverse friction shift element and placing the switchable device in the lock-lock state. The controller is programmed to respond to a shift into reverse with the switchable shift element overrunning by at least partially engaging two of the friction shift elements to exert negative torque on the output shaft to slow the vehicle. In some embodiments, the controller may also at least partially engage a third friction shift element, which may be the reverse friction shift element. The controller may be further programmed to switch the switchable shift element into the lock-lock state after the output shaft decelerates below a threshold speed.

A method of controlling a transmission includes responding to a shift into reverse by at least partially engaging at least three friction elements to exert negative torque on a transmission output shaft and a turbine shaft and then commanding a switchable one way brake to prevent rotation of an internal shaft. After commanding the switchable one way brake to change state, the method may also include releasing all but one friction shift elements to establish a reverse power flow path.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
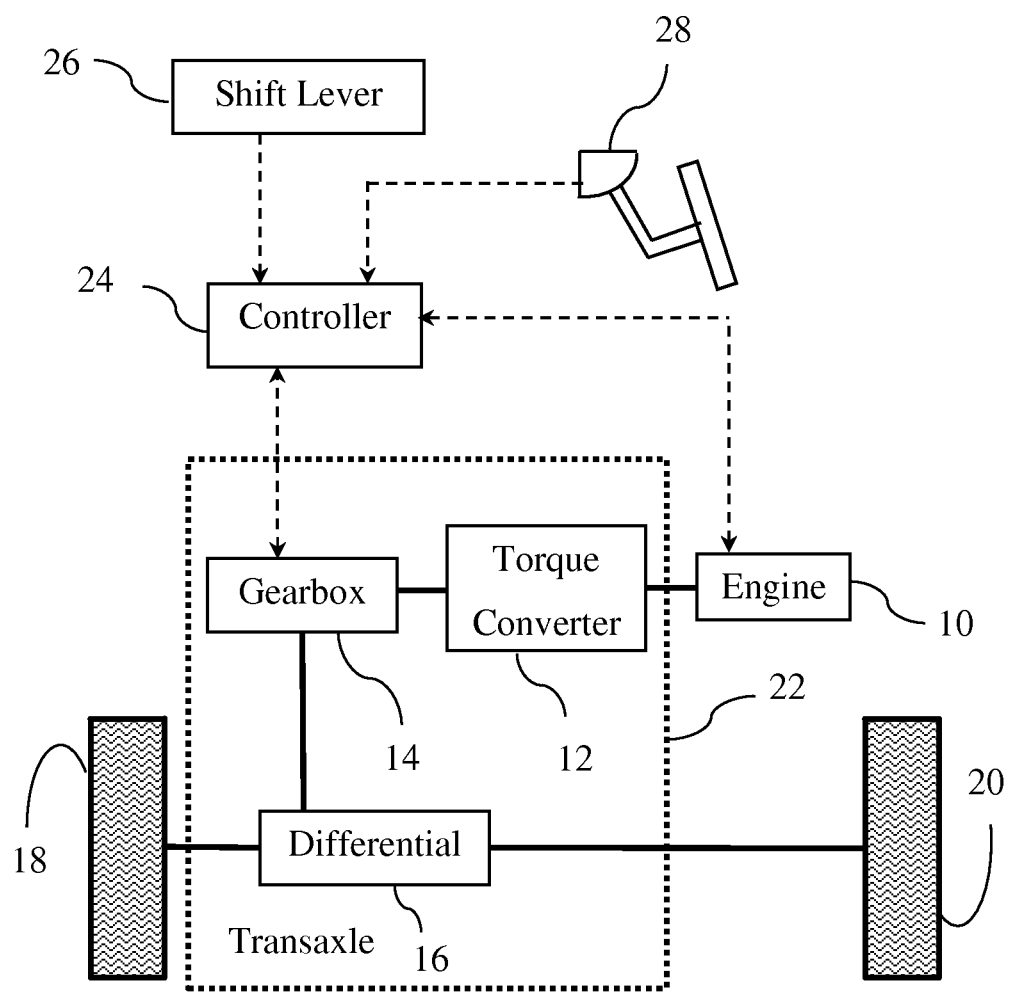
FIG. 1 is a schematic representation of a vehicle powertrain.

A front wheel drive (FWD) vehicle powertrain is illustrated schematically in FIG. 1. Mechanical connections are indicated by solid lines and signals are indicated by dashed lines. Power is provided by internal combustion engine 10. Torque converter 12 includes an impeller driven by the engine crankshaft and a turbine. The turbine is fixed to the input shaft of gearbox 14. The torque converter also includes a bypass clutch which selectively couples the impeller to the turbine. When the bypass clutch is engaged, torque is transferred by the bypass clutch. When the bypass clutch is disengaged, torque is transferred hydro-dynamically between the impeller and the turbine. Gearbox 14 includes a number of planetary gear sets and shift elements interconnected to establish a variety of power flow paths, each with a distinct speed ratio, by selective engagement of the shift elements. Power is transferred from an output element of gearbox 14 to differential 16. The power may be transferred by means of meshing gears or by means of a chain. The transfer may also multiply the torque and reduce the speed by a fixed final drive ratio. Differential distributes the power to left and right front wheels 18 and 20 allowing slight speed differences as the vehicle turns a corner. The torque converter, gearbox, and differential may collectively be called a transaxle 22 or a transverse transmission. A rear-wheel drive vehicle powertrain has similar components although the engine, torque converter, gearbox, and differential are located along the vehicle centerline and drive rear wheels. The present invention is applicable to both front wheel drive and rear wheel drive powertrain configurations.

The engine and gearbox respond to commands from controller 24. The controller sends signals to gearbox 14 to apply particular shift elements. The controller sends signals to engine 10 indicating what amount of torque to produce. Controller 24 receives signals from a variety of sensors, including a shift lever 26 and an accelerator pedal 28. The driver moves shift lever 26 among several positions to indicate the desired direction of travel. A D position indicates a desire to move forward. An R position indicates a desire to move backwards. An N position indicates a desire for neutral. A P position indicates a desire to engage park. The term shift lever is used here to represent any user interface element intended to indicate these choices including, for example, a console mounted lever, a steering wheel mounted lever, or a touch screen. Controller 24 may be implemented, for example, as a single micro-processor or as multiple communicating micro-processors.

Figure 2:
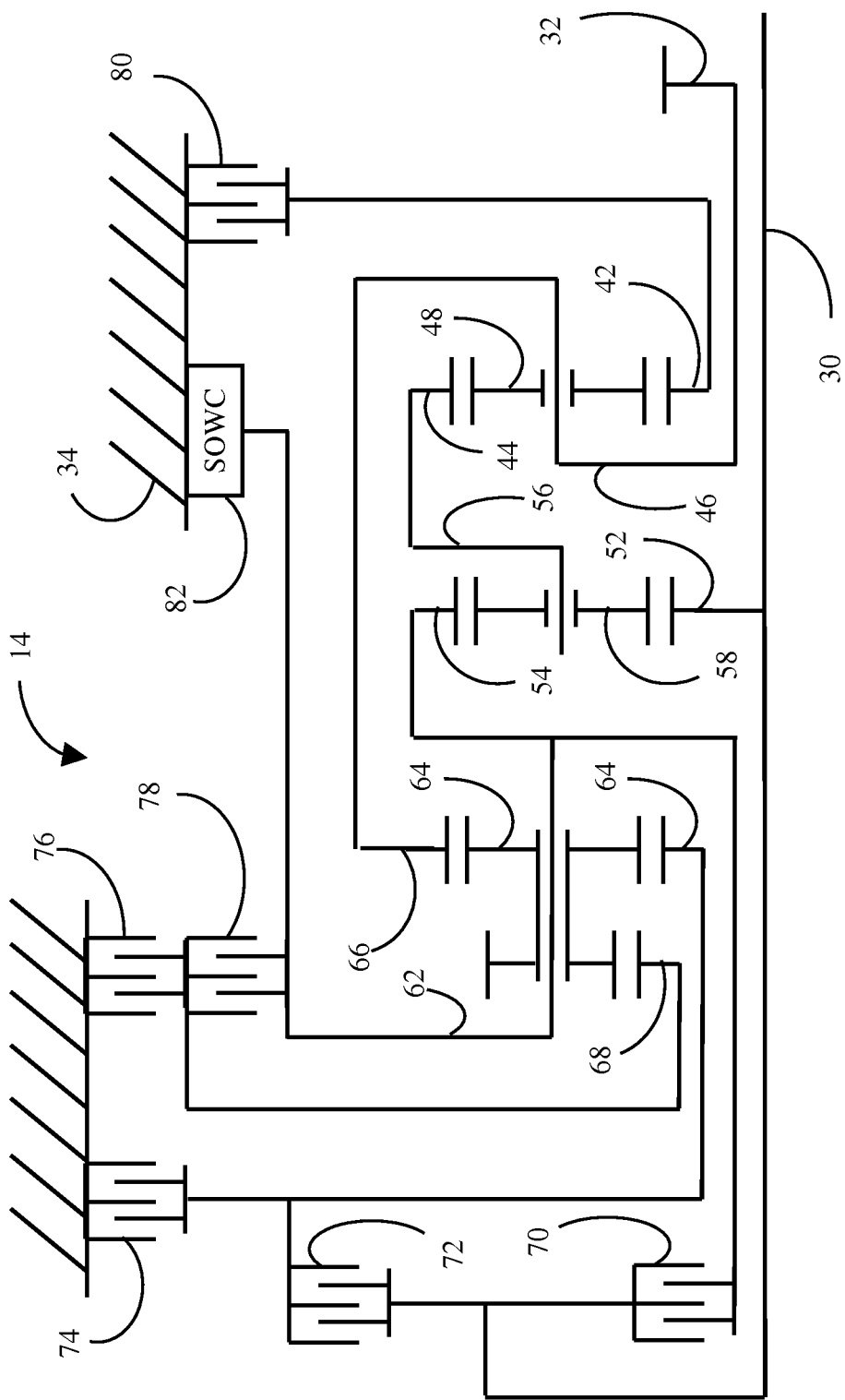
FIG. 2 is a schematic representation of a gearbox arrangement.

An exemplary arrangement of gearbox 14 is illustrated in FIG. 2. Gearbox 14 includes an input shaft 30 driven by the torque converter turbine, an output element 32, and a transmission case 34 fixed to vehicle structure. Shafts other than the input shaft and output shaft may be called internal shafts. A first simple planetary gear set includes sun gear 42, ring gear 44, carrier 46 fixedly coupled to output element 32 and supporting a number of planet gears 48 that each mesh with both sun gear 42 and ring gear 44. A second simple planetary gear set includes sun gear 52 fixedly coupled to the input shaft 30, ring gear 54, carrier 56 fixedly coupled to ring gear 44 and supporting a number of planet gears 58 that each mesh with both sun gear 52 and ring gear 54. The third planetary gear set includes a carrier 62 fixedly coupled to ring gear 54 and supporting a number of stepped planet gears 64. Each stepped planet gears include a set of gear teeth meshing with both sun gear 64 and ring gear 66 and a second smaller diameter set of gear teeth meshing with sun gear 68.

Gearbox 14 further includes a set of hydraulically actuated friction shift elements 70, 72, 74, 76, 78, and 80. A friction shift element may be in a disengaged state, a partially engaged state, or a fully engaged state. In a disengaged state, the selectively coupled elements are free to rotate at different speeds with negligible torque transfer. In the partially engaged state, torque is transferred between elements rotating at different speeds. The amount of torque transferred is equal to the shift element torque capacity. In the fully engaged state, the elements are constrained to rotate (or not rotate) as a unit. A shift element remains in the fully engaged state as long as the torque capacity exceeds the torque required to keep the elements rotating as a unit. Carrier 62 and ring gear 54 are selectively coupled to input shaft 30 by clutch 70. Sun gear 68 is selectively coupled to input shaft 30 by clutch 72 and selectively held against rotation by brake 74. Sun gear 68 is selectively held against rotation by brake 76 and selectively coupled to carrier 62 and ring gear 54 by clutch 78. Sun gear 42 is selectively held against rotation by brake 80.

Selectable One Way Brake (SOWB) 82 is actively controlled to be in one of two states. In a lock-lock state, SOWB 82 holds carrier 62 and ring 54 against rotation in both directions. In a lock-free state, SOWB 82 passively restrains carrier 62 and ring gear 54 from rotating in a reverse direction, but permits rotation in a forward direction. Forward direction is defined as the direction of rotation of input shaft 30 when the transmission is transmitting power from the engine to the wheels. Unlike a friction shift element, SOWB does not have a partially engaged state in which it can transmit torque between elements that have relative speed. Consequently, transitioning from the lock-free state to the lock-lock state in the presence of relative rotation causes an abrupt change in element speed, resulting in a high short duration torque at the transmission output. The magnitude of this torque pulse depends upon the inertia of the elements that change in speed and the torque transfer path to the output element. In extreme cases, components may break.

The shift elements of gearbox 16 are engaged in combinations of two to establish nine forward speed ratio power flow paths and one reverse speed ratio power flow path as shown in Table 1. (SOWB is considered engaged when it is transmitting torque as opposed to overrunning.) Note that SOWB 82 is in the lock-lock state only in the reverse power flow path. SOWB 82 is in lock-free state in all of the forward power flow paths. In the 1st gear power flow path, SOWB transmits torque whenever the power is transferred from input shaft 30 output shaft 32. This power flow path is incapable of transmitting power from output 32 to input 30 with SOWB 82 in the lock-free state because SOWB 82 overruns. (Some transmission may implement an operating mode in which SOWB 82 is in the lock-lock state when in 1st gear to provide engine braking.) Use of a one way brake simplifies the control of an upshift where the selectable device is the off-going element. This is most valuable for a shift from 1st gear to 2nd gear because any torque disturbances created from inaccurate control are magnified by the torque ratio. In some gearing arrangements, the device may be a selectable one way clutch that, in one state, allows relative rotation in only direction between two rotating shafts and, in another state, couples the two rotating shafts.

TABLE 1

| | 70 | 72 | 74 | 76 | 78 | 80 | 82 | Ratio | Step |
|---|---|---|---|---|---|---|---|---|---|
| Rev | | X | | | | | lock-lock | −2.96 | 63% |
| 1st | | | | | | X | lock-free (engaged) | 4.69 | |
| 2nd | | | | X | | X | lock-free (overrunning) | 3.31 | 1.42 |
| 3rd | | | X | | | X | lock-free (overrunning) | 3.01 | 1.10 |
| 4th | | | | | X | X | lock-free (overrunning) | 2.45 | 1.23 |
| 5th | | X | | | | X | lock-free (overrunning) | 1.92 | 1.27 |
| 6th | X | | | | | X | lock-free | 1.45 | 1.33 |

TABLE 1-continued

| | 70 | 72 | 74 | 76 | 78 | 80 | 82 | Ratio | Step |
|---|---|---|---|---|---|---|---|---|---|
| 7th | X | X | | | | | (overrunning) lock-free (overrunning) | 1.00 | 1.45 |
| 8th | X | | | | X | | lock-free (overrunning) | 0.75 | 1.34 |
| 9th | X | | | X | | | lock-free (overrunning) | 0.62 | 1.21 |

When shift lever 26 is moved from the drive position to the reverse position, controller 24 needs to command engagement of friction clutch 72, command SOWB 82 to enter the lock-lock state, and release all other friction shift elements in order to establish the power flow path for reverse. When the vehicle is stationary with the 1st gear power flow path established (brake 80 engaged), there is no relative speed across SOWB 82, so the transition is straight forward. Specifically, since output 32 is stationary, carrier 46 is also stationary. Since brake 80 is holding sun gear 42 stationary, ring gear 44 and carrier 56 will also be stationary. Since the torque converter impeller is rotating at least at engine idle speed, it will apply positive torque to sun gear 52 as long as the turbine is rotating slower than the impeller and clutches 70 and 72 are both released. This positive torque on sun gear 52 with carrier 56 stationary will tend to force ring gear 54 and carrier 62 to rotate in the opposite direction. However, SOWB 82 restrains them from rotating backwards. Even when the vehicle is moving forward at a slow speed, SOWB 82 will be engaged. However, if the speed of output 32 exceeds the engine speed divided by the 1st gear ratio, then SOWB will overrun.

If the driver moves shift lever 26 into the reverse position while SOWB 82 is overrunning, then the controller must ensure that carrier 62 is stopped or almost stopped before switching SOWB to the lock-lock state. Otherwise, the sudden deceleration of carrier 62 will cause a torque impulse that is disturbing to vehicle occupants and may even cause transmission components to fail. SOWB 82 may be overrunning either because the transmission is in a forward gear higher than 1st gear, or because the vehicle speed is high enough that the SOWB overruns in 1st gear. The controller could simply disengage all friction shift elements except 80 and wait for the vehicle speed to drop sufficiently to permit switching SOWB 82 to the lock-lock state. However, a driver expects negative torque soon after moving the shift lever to reverse and will be dissatisfied if the vehicle does not respond for too long.

Figure 3:
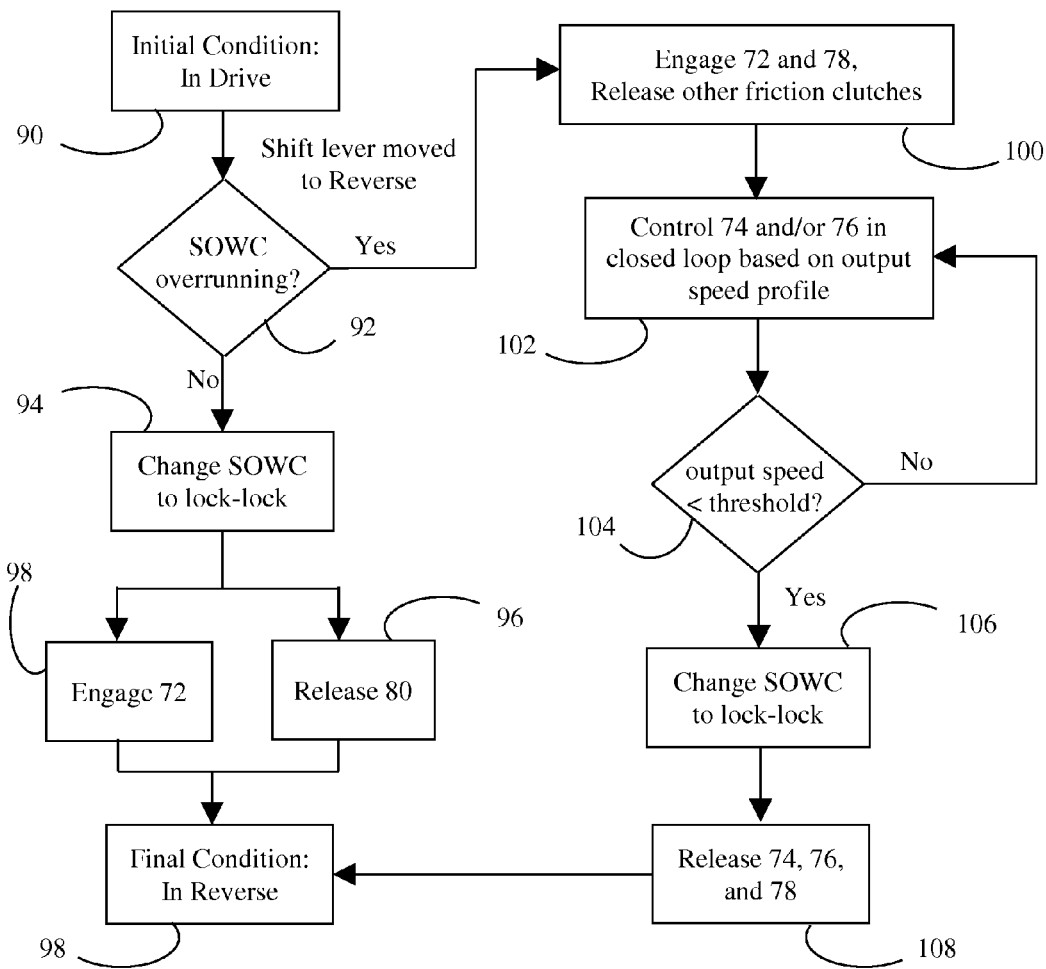
FIG. 3 is a flow chart for a first method of engaging reverse of the gearbox arrangement of FIG. 2 while a vehicle is moving forward.
Figure 4:
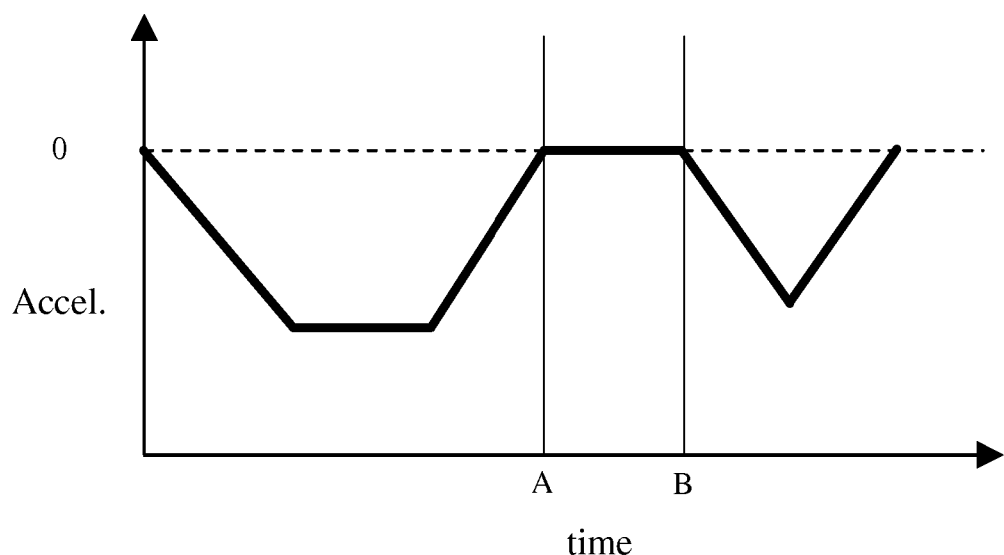
FIG. 4 is a graph illustrating vehicle acceleration and vehicle speed during execution of the method of FIG. 3.
Figure 4:
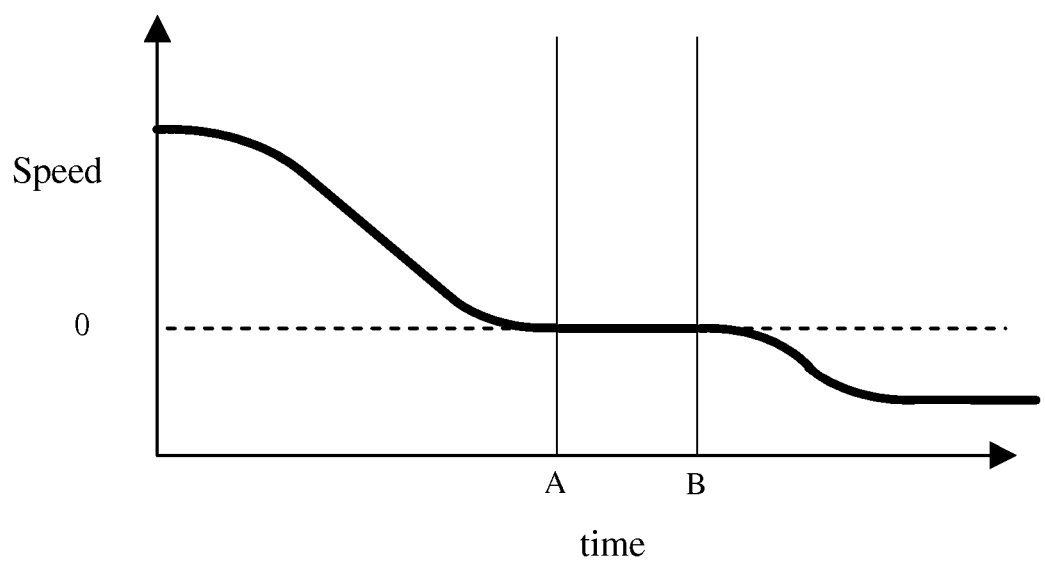

FIG. 3 is a flow chart for a process of managing reverse engagements that avoids long delays even when the vehicle is initially moving forward. FIG. 4 illustrates vehicle speed and acceleration as a function of time when the method of FIG. 3 is executed. The method begins at 90 with shift lever 26 in a drive position and the transmission shift elements engaged to establish one of the forward driving gear ratios. The method progresses to 92 in response to the driver moving shift lever 26 to the reverse position. If SOWB 82 is not overrunning at 92, then control moves to 94 where the state of SOWB 82 is switched to the lock-lock state. The controller may determine whether it is overrunning using a speed sensor on carrier 62 or by computing the speed of carrier 62 based on other speed sensors. At 96, brake 80 is released. Simultaneously, at 98, clutch 72 is engaged. (This assumes the transmission was previously in 1st gear, which would ordinarily be the case any time SOWB 82 is not overrunning.) Once these engagements and disengagements have completed, the transmission is in final state 98 with reverse gear engaged.

If SOWB 82 is determined to be overrunning at 92, the controller takes affirmative action to slow the vehicle. At 100, the controller engages clutches 72 and 78 and releases all other friction elements. Engaging clutch 72 prepares the transmission for eventual engagement of reverse gear. Engaging clutch 78 couples carrier 62, sun gear 64, and sun gear 68 to output element 32. With clutch 78 engaged, brakes 74 and 76 both act to slow the vehicle. At 102, one or both of brake 74 and 76 are partially engaged to slow the vehicle. As shown before time A in FIG. 5, the objective is to control the speed profile such that the vehicle reaches zero speed smoothly. This is accomplished by using a speed measurement as a closed loop feedback signal. This continues until the output speed falls below a threshold as determined at 104. The threshold is selected such that any torque impulse resulting from switching SOWB 82 to the lock-lock state with multiple friction elements engaged is acceptable. At 106, the state of SOWB 82 is switched to the lock-lock state. This occurs with the vehicle at a steady speed very close to zero between A and B in FIG. 5. At 108, shift elements 74, 76, and 78 are all released placing the transmission in reverse at 98. (Brakes 74 and 76 would already have been at very close to zero torque capacity.) Once in reverse, the vehicle begins to accelerate backwards as shown after time B in FIG. 5. Ideally, the time between A and B is as short as possible such that the maneuver feels to vehicle occupants like a continuous deceleration.

Figure 5:
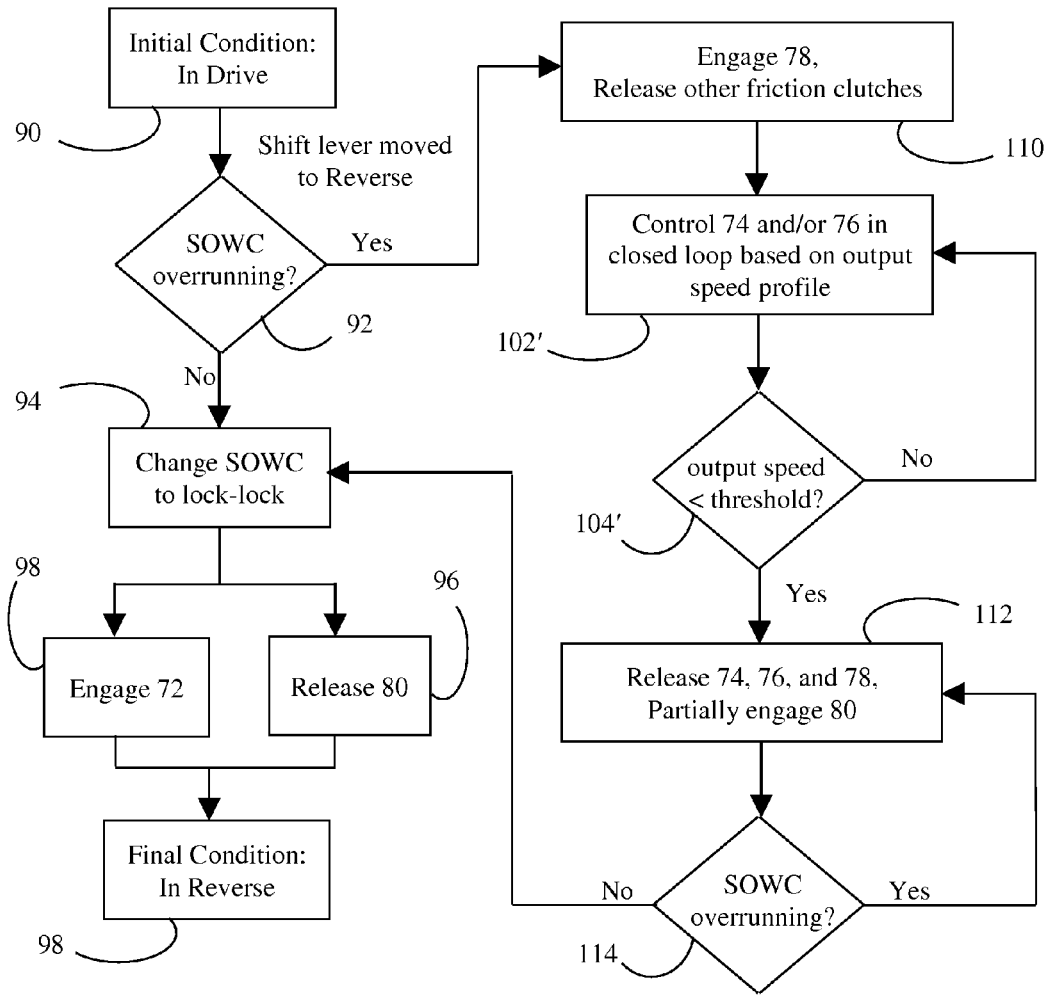
FIG. 5 is a flow chart for a second method of engaging reverse of the gearbox arrangement of FIG. 2 while a vehicle is moving forward.
Figure 6:
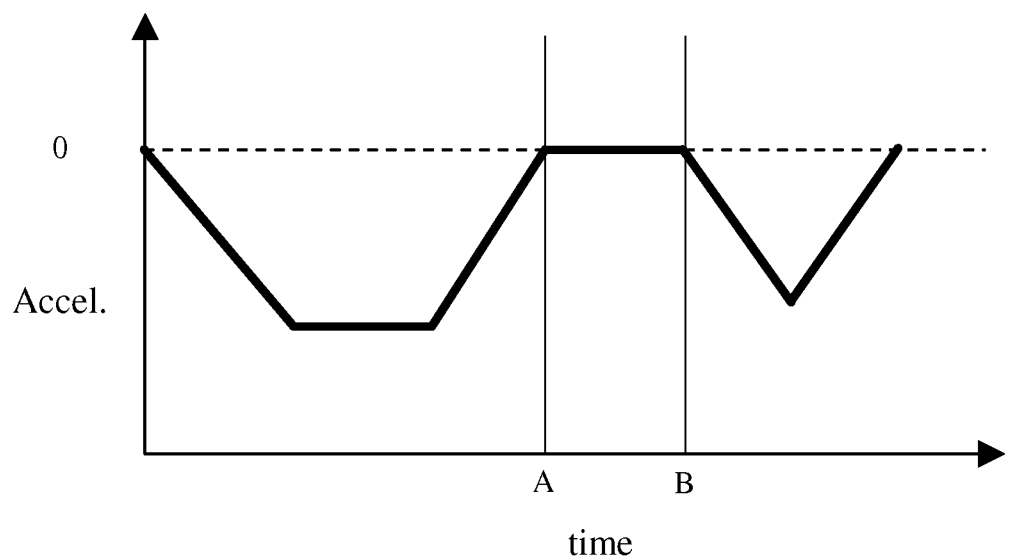
FIG. 6 is a graph illustrating vehicle acceleration and vehicle speed during execution of the method of FIG. 5.
Figure 6:
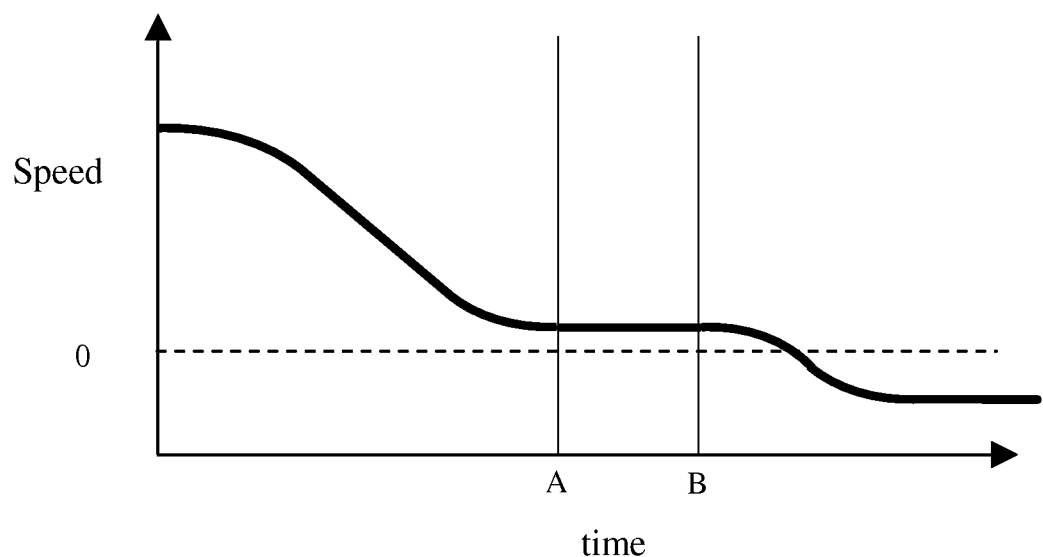

FIG. 5 is a flow chart for an alternative process of managing reverse engagements that also avoids long delays even when the vehicle is initially moving forward. FIG. 5 illustrates vehicle speed and acceleration as a function of time when the method of FIG. 4 is executed. Like the method of FIG. 3, the method begins at 90 with shift lever 26 in a drive position and the transmission shift elements engaged to establish one of the forward driving gear ratios and progresses to 92 in response to the driver moving shift lever 26 to the reverse position. If SOWB 82 is not overrunning at 92, then the transition to reverse is accomplished in the same manner as the method of FIG. 3. The method differs if SOWB 82 is determined to be overrunning at 92. Like the method of FIG. 3, the controller takes affirmative action to slow the vehicle. At 110, the controller engages clutch 78 and releases all other friction elements, including clutch 72. With clutch 78 engaged, brakes 74 and 76 both act to slow the vehicle. At 102', one or both of brake 74 and 76 are partially engaged to slow the vehicle. This step differs from 102 in the method of FIG. 3 only in that the target speed profile is slightly different. As shown before time A in FIG. 6, the objective is to control the speed profile such that the vehicle smoothly reaches a low, positive speed. This continues until the output speed falls below a threshold as determined at 104'. This step differs from 104 in the method of FIG. 3 in that the threshold is not as close to zero. Since clutch 72 is not engaged, the turbine speed tends toward the engine speed. At 112, Shift elements 74, 76, and 78 are released and brake 80 is partially engaged. Partial engagement of brake 80 with the vehicle slow (and therefore carrier 46 slow) tends to slow ring 44 and carrier 56. With the turbine and sun gear 52 rotating near engine speed, slowing carrier 56 causes ring gear 54 and carrier 62 to slow down until SOWB 82 engages to prevent it from rotating backwards. When engagement of SOWB 82 is detected at 114, its state is changed at 94 as shown between A and B in FIG. 6. Then, reverse is engaged and the vehicle begins to accelerate backwards as shown after time B in FIG. 6. Ideally, the time between A and B is as short as possible such that the maneuver feels to vehicle occupants like a continuous deceleration.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of controlling a transmission comprising:
   in response to movement of a shift lever into reverse while a selectable one way brake is overrunning, at least partially engaging at least three friction shift elements to exert a negative torque on a transmission output shaft; and
   in response to an output shaft speed decreasing to less than a threshold, commanding the selectable one way brake to prevent rotation of an internal shaft in both directions.

2. The method of claim 1 further comprising releasing all but one friction shift element to establish a reverse power flow path between an input shaft and the output shaft.

3. The method of claim 1 wherein at least partially engaging the at least three friction shift elements also exerts negative torque on an input shaft.

4. A method of controlling a transmission comprising:
   in response to movement of a shift lever into reverse while a selectable one way brake is overrunning, at least partially engaging a combination of friction elements to exert negative torque on both an output shaft and a turbine shaft; and
   in response to an output shaft speed decreasing to less than a threshold, commanding the selectable one way brake to hold an internal shaft in both directions.

5. The method of claim 4 wherein the combination of friction elements includes a reverse shift element.

6. The method of claim 5 further comprising releasing all friction shift elements except the reverse shift element to establish a reverse power flow path between the turbine shaft and the output shaft.

* * * * *